United States Patent
Brander et al.

(10) Patent No.: US 9,226,147 B2
(45) Date of Patent: Dec. 29, 2015

(54) SYSTEM AND METHOD OF SECURING INSTANT MESSAGING SESSIONS

(71) Applicant: BlackBerry Limited, Waterloo (CA)

(72) Inventors: Ryan Conrad Brander, Beaverbank, CA (US); Shiladitya Sircar, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/294,140

(22) Filed: Jun. 2, 2014

(65) Prior Publication Data

US 2015/0350895 A1    Dec. 3, 2015

(51) Int. Cl.
*H04W 4/12*    (2009.01)
*H04W 12/04*    (2009.01)
*H04L 12/58*    (2006.01)

(52) U.S. Cl.
CPC ............... *H04W 12/04* (2013.01); *H04L 51/04* (2013.01)

(58) Field of Classification Search
CPC ................................ H04W 4/12; H04W 4/022
See application file for complete search history.

(56) References Cited

U.S. PATENT DOCUMENTS

| 8,331,912 | B1* | 12/2012 | Lundy | H04L 67/1095 455/41.2 |
|---|---|---|---|---|
| 8,682,394 | B2* | 3/2014 | Lazaridis | H04M 1/72552 370/310.2 |
| 8,731,586 | B2* | 5/2014 | Schmidt | H04L 12/585 455/411 |
| 8,929,932 | B1* | 1/2015 | Lan | H04W 4/14 370/351 |
| 2014/0045461 | A1* | 2/2014 | Khoury | G06Q 10/107 455/411 |
| 2015/0050914 | A1* | 2/2015 | Bianco et al. | 455/411 |

* cited by examiner

*Primary Examiner* — Cong Tran
(74) *Attorney, Agent, or Firm* — Jenna L. Wilson; Dimock Stratton LLP

(57) ABSTRACT

A wireless communication device, computer program product and method of establishing secure communications between a first wireless communication device and a second wireless communication device for an instant messaging application is provided. Contact information representing a contact associated with a second wireless communication device is received at the first device. The contact information includes capability information. The first device determines from the capability information whether the second device is capable of communicating using an enhanced encryption scheme, and if so, establishes a protected communication session by sending a pass phrase to the second device via an out of band channel and receiving the pass phrase back from the second device via the instant messaging application. Communication between the devices is performed using an enhanced encryption scheme.

20 Claims, 13 Drawing Sheets

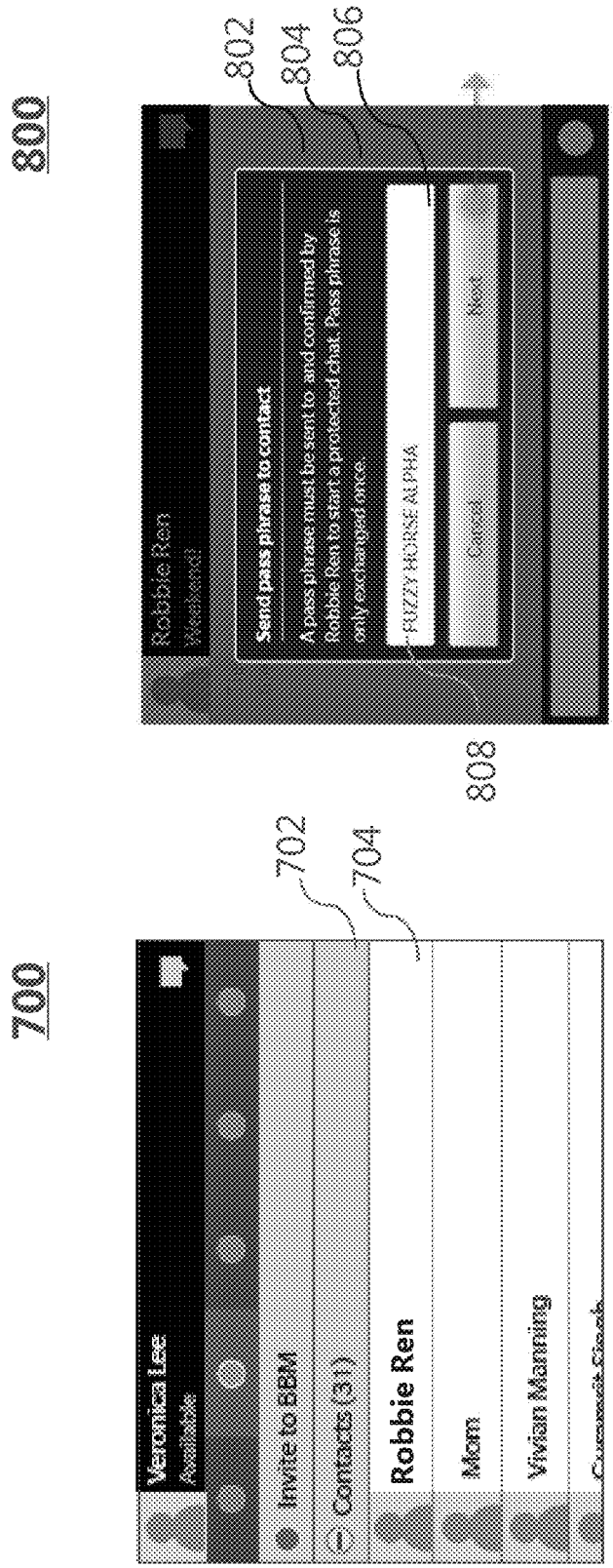

SYSTEM AND METHOD OF SECURING INSTANT MESSAGING SESSIONS

BACKGROUND OF THE INVENTION

1. Field of the Invention

The present invention relates to an instant messaging system and more particularly to a system and method of securing instant messaging sessions.

2. Description of the Related Art

Data security in electronic communications is essential for many organizations, particularly in regulated industries, government services and industries in which the electronic communications may contain sensitive, proprietary or confidential information. While the number of platforms for electronic communications have increased (e.g., email, text messaging, instant messaging, social networking, etc.), by in large, a great deal of the electronic communications over mobile networks remains unprotected or minimally protected, placing the content of those communications at risk for interception.

BRIEF DESCRIPTION OF THE DRAWINGS

Embodiments will now be described by way of example only with reference to the appended drawings wherein:

FIG. 7 is a screen shot of an example of a graphical chat interface for a selecting a contact in an IM application;

FIG. 8 is a screen shot of an example of a graphical user interface for a sending an out of band pass phrase;

DETAILED DESCRIPTION OF THE INVENTION

Examples of the present disclosure address deficiencies of the art in respect to limitations in securing instant messaging sessions and provide a novel and non-obvious method, system and computer-readable media for applying an enhanced encryption scheme to instant messaging applications.

Existing instant messaging encryption methods either require device specific identifiers stored at a central repository or rely exclusively on security associated with establishing a connection between the wireless communication device and a wireless network.

In accordance with one aspect, a flexible, enhanced protection system for instant messaging that allows an organization to have more control over their sensitive and confidential information is provided. In one example, an instant messaging (IM) application can select the type of protection scheme for each contact listed in the IM application. The selection is based on an Information Technology (IT) policy which is generally set and stored on an enterprise server operated by the organization.

In accordance with another aspect, a method of establishing secure communications between a first wireless communication device and a second wireless communication device for an instant messaging application is provided. Contact information representing a contact associated with a second wireless communication device is received at the first device. The contact information includes capability information. The first device determines from the capability information whether the second device is capable of communicating using an enhanced encryption scheme, and if so, establishes a protected communication session by sending a pass phrase to the second device via an out of band channel and receiving the pass phrase back from the second device via the instant messaging application. Communication between the devices is performed using an enhanced encryption scheme.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

Figure 1:
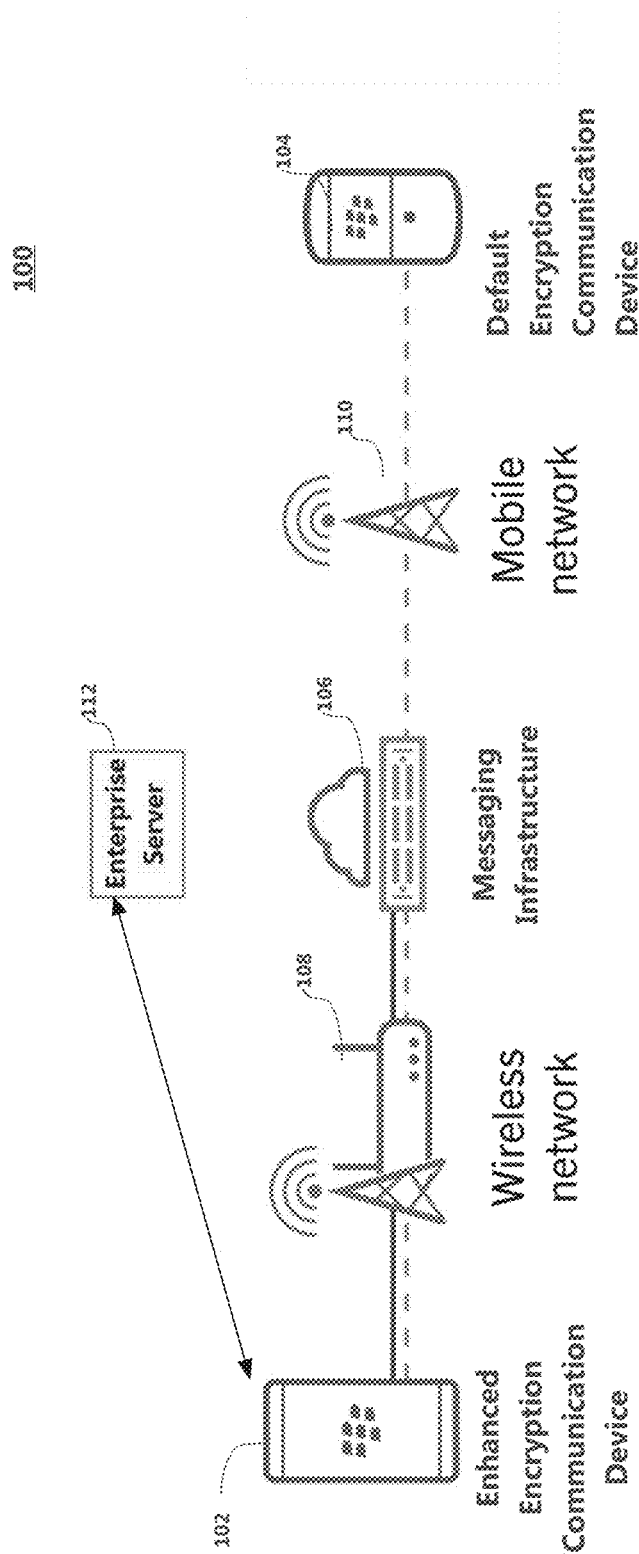
FIG. 1 is a schematic diagram of a wireless communication system in accordance with various example instant message (IM) protection schemes.

Referring now to FIG. 1, a wireless communication system 100 includes a multiplicity of wireless communication devices 102 (one shown for the sake of clarity) capable of communicating in a protected mode using enhanced encryption methods. The wireless communication system 100 also includes a multiplicity of wireless communication devices 104 (one shown for the sake of clarity) which are operating in this example according to a default, base, or lowest level policy (hereafter referred to as a "default" policy) having a lowest or baseline level of security among a plurality of policy levels. For example, the default policy can have encryption based on an encryption/decryption key stored on the mobile device 104 at the time of manufacture, which is common to all mobile devices 102, 104 of a particular type. It can be appreciated that the default policy can include a lowest level of security or no security at all. The wireless communication devices 102, 104 are coupled to a messaging infrastructure 106 through a variety of wireless networks 108 and mobile (cellular) networks 110. Additionally, an enterprise server 112 is coupled to each wireless communication device 102 that is capable of operating in a protected mode using an enhanced encryption scheme. The enterprise server 112 maintains an IT policy 114 which determines and stores the capability of each wireless communication device 102 monitored by the enterprise server 112, generally through the use of a protection parameter (e.g. Protection mode="ON"). It should be noted that the IT policy 114 may selectively disable the use of the protected mode in a specific wireless communication device by setting the protection mode parameter to "OFF" even if the wireless communication device 102 has the ability to use enhanced encryption. For wireless communication devices 104 not monitored by an enterprise server, the protection mode parameter is automatically set to "OFF" and a default protection scheme will be used.

Figure 2:
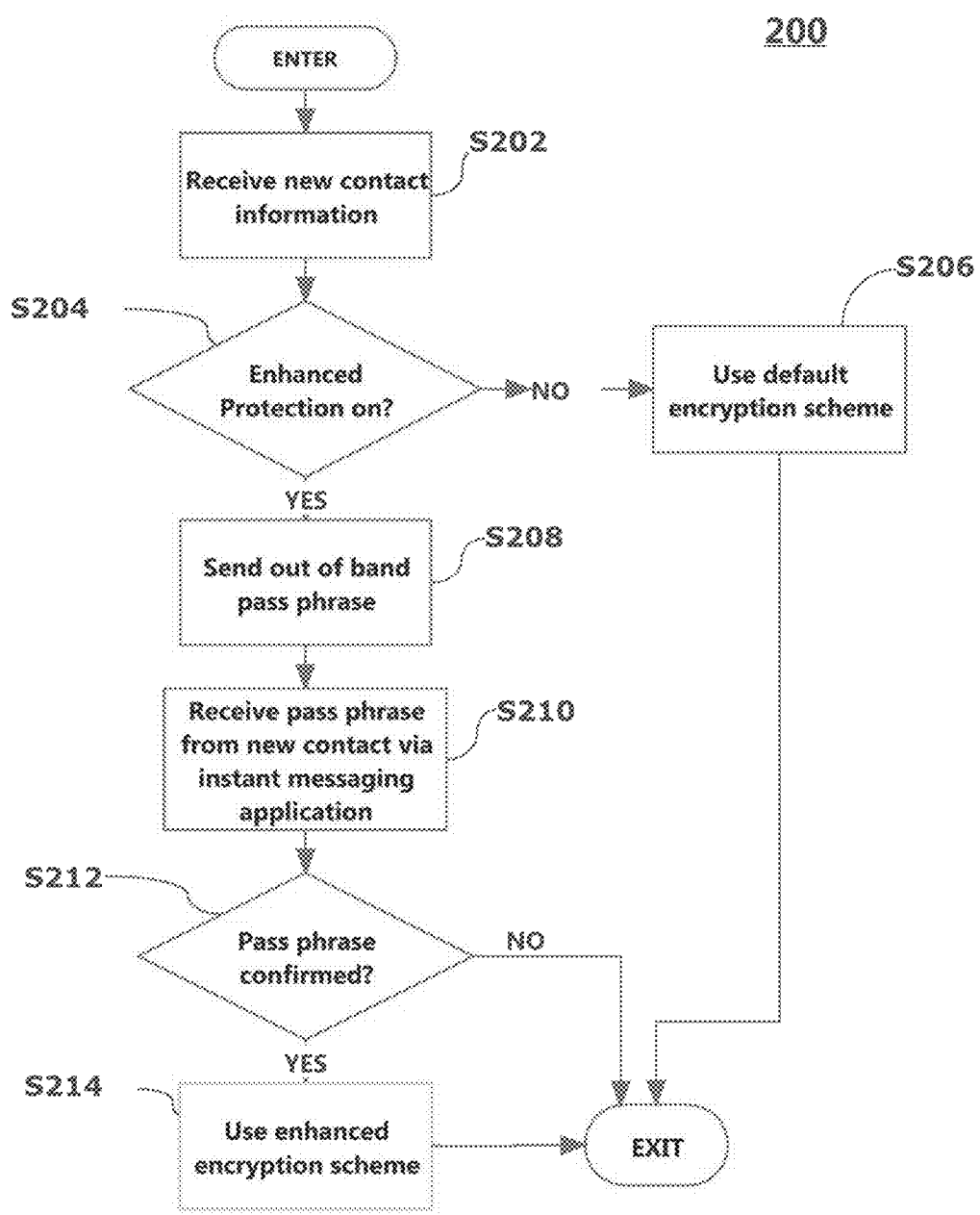
FIG. 2 is a flow chart illustrating computer executable operations that may be performed in an IM protection selection between two wireless communication devices.

Referring now to FIG. 2, a flow chart 200 is shown which illustrates computer executable operations that may be performed in an IM protection selection method between two wireless communication devices. One example for utilizing protected IM messages will now be described by way of example, in which the mobile device 102, 104 may utilize either a default policy or a "protected" policy. The "protected" policy adds additional encryption measures. Each mobile device 102, 204 that is subjected to the protected policy utilizes two long-term public/private key pairs that are static for the device and associated user, namely an encryption key pair and a signing key pair. To communicate protected IM messages, the mobile device creates a pair-wise key with each contact that is also using the protected policy. For one-to-one communications, the pair-wise key can be considered a session key. The session key is used to encrypt all messages within an IM conversation. The pair-wise key is derived from the initiator's private encryption key and the recipient's public encryption key. It should be noted that each public/private key pair may be generated by or stored on the communication device or received from a third party, such as a key store. Each session key is combined with unencrypted (but signed) keying material in the protected IM message to produce a message encryption key. The message encryption key is derived from the keying material and session key, using a key derivation function (KDF).

The key exchange process is used to establish contact-specific keys for each IM contact with which a particular mobile device 10 wishes to communicate in accordance with the protected policy. The process begins, at step S202, when the wireless communication device initiating the IM conversation receives contact information for a new contact. The contact information may include a name, phone number, address, or other device identifier for the invited contact. The contact information may be received wirelessly via any messaging platform, or manually input by the device user using a user interface. The IM application sends capability messages between the wireless communication devices. One of these capabilities is whether or not IM Protected is on. In order to use the enhanced protection scheme, both the inviting device and the invited device must have the enhanced protection on (at step S204). If one of the devices does not have enhanced protection on (at step S204), a default encryption scheme is used (at step 206) to transfer IM messages between those two devices.

In order to exchange keys, the parties exchange a shared secret (referred to hereinafter as a "pass phrase," which illustrates one example of such a shared secret) using an out-of-band communication channel, i.e., using a communication medium other than the messaging infrastructure 106 used to conduct IM communications. For example, the out-of-band mechanism can include email, Short Message Service (SMS), telephone, manual delivery (in person), short-range communications (e.g., Near Field Communications (NFC), WiFi, Bluetooth, infrared, etc.), etc. The inviting device sends (at step S208) the out-of-band pass phrase to the invited device. Alternatively, the out-of-band pass phrase may be sent using any of the above mentioned means with or without the involvement of the inviting device.

The shared secret can be generated in various ways, for example, using an auto-generated pass phrase. As discussed below, the pass phrase can be editable and/or can be user-supplied. The out-of-band exchange makes malicious third party attacks more difficult since such a third party should not know when or how the secret will be shared. The attacker would need to intercept both communications over the messaging infrastructure 106 and the out-of-band channel used for the shared secret exchange in order to compromise the key exchange. The use of an out-of-band channel can also enable the messaging infrastructure 106 to be removed from the key management process, thus allowing further flexibility for enterprise and individual entities.

The inviting device receives (at step S210) a pass phrase from the invited device via the IM application. If the pass phrase matches (at step S212) the pass phrase established for the invited device, any future IM communication between the two devices will use (at step S214) the enhanced protection scheme. Public/private encryption and signing key pairs are exchanged between devices. These keys are stored on the devices.

Figure 3:
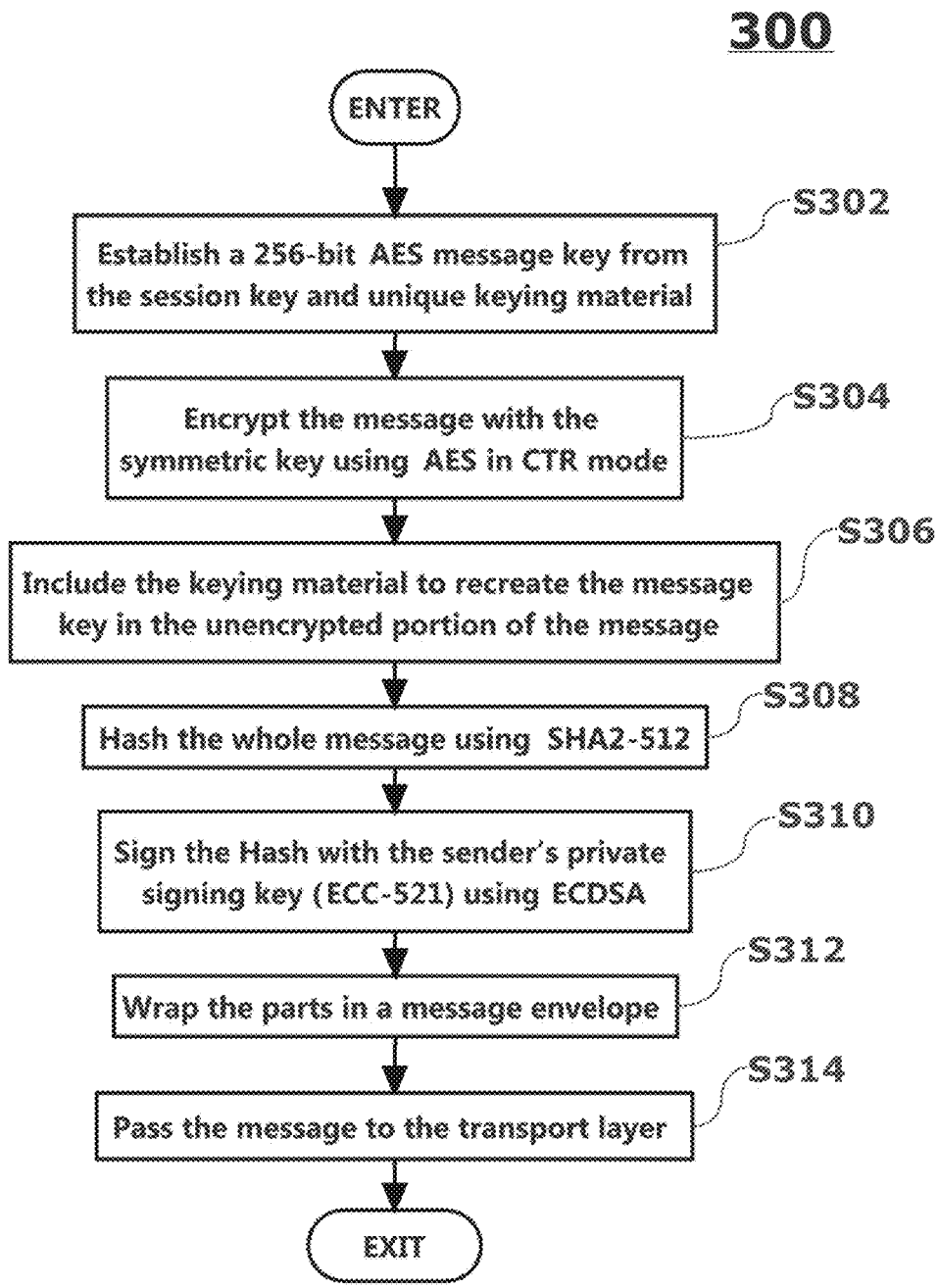
FIGS. 3 and 4 are flow charts illustrating computer executable operations that may be performed in encrypting an IM under an enhanced encryption scheme.
Figure 4:
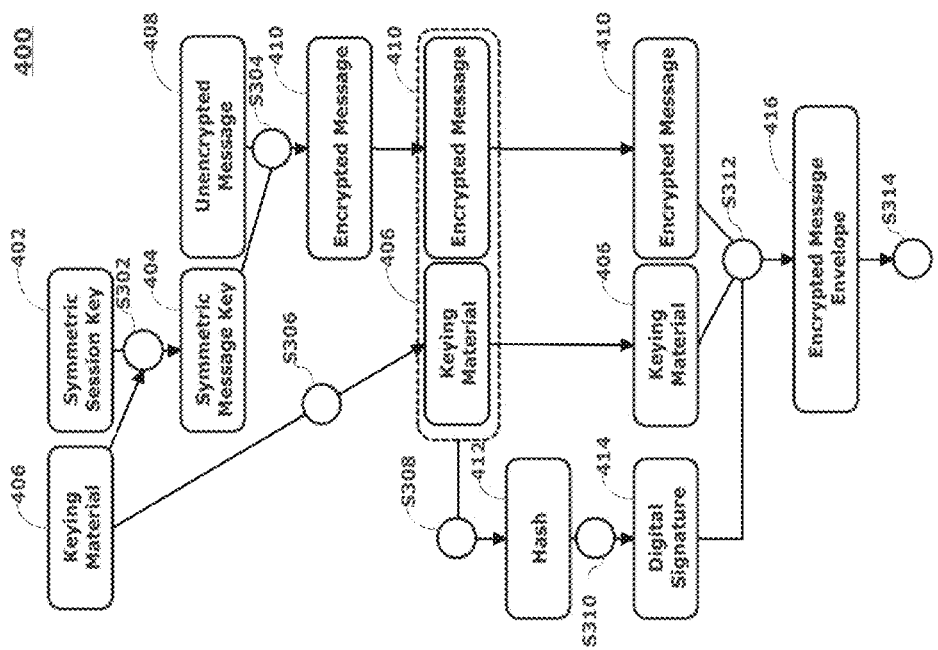

Referring now to FIGS. 3 and 4, a flow chart 300 and state diagram 400 illustrate a process for encrypting an outgoing instant message using an enhanced protection scheme. The public encryption key of the receiving device and the private encryption key of the sending device are used to establish a session key 402. A unique per message key 404 is established (at step 302) by applying a key derivation function (KFD) to the session key 402 and the random keying material 406. The message key may 404 be a 256-bit Advanced Encryption Standard (AES) key, but there are no restrictions on the length of the message key 404 or encrypting algorithm used. The message key 404 is used to encrypt (at step S304) the unencrypted message 408. The random keying material 406 is included (at step S306) with the encrypted message 410 in an unencrypted form and then hashed (at step S308) together (e.g., using a secure hash algorithm such as SHA-512) to form a hash 412. The hash 412 is signed (at step S310) with the private signing key of the sending device. The signed hash 414, random keying material 406 and the encrypted message 410 are then wrapped (at step S312) in a message envelope and the encrypted message envelope 416 is passed (at step s314) to the transport layer for delivery to the receiving device.

Figure 5:
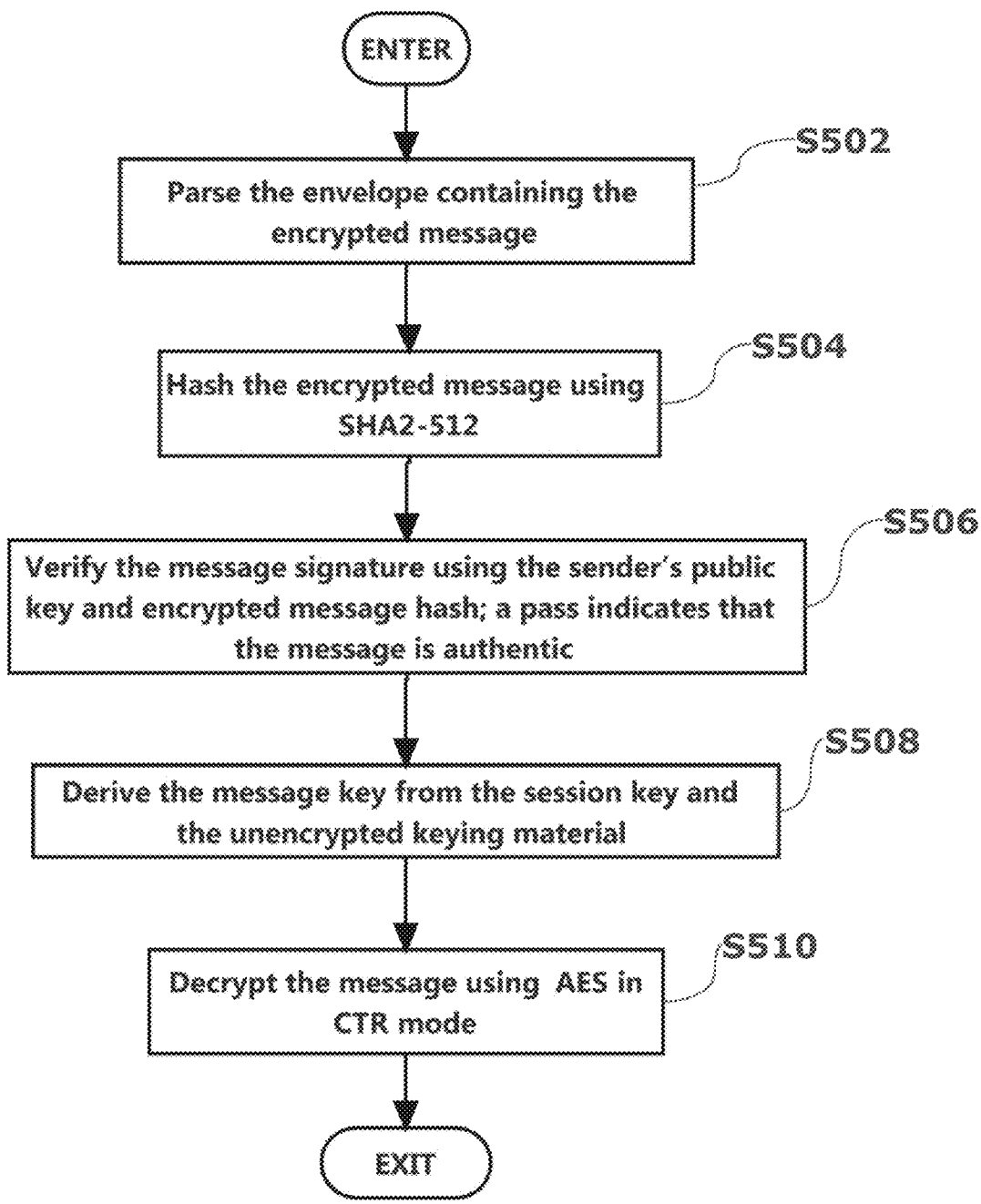
FIGS. 5 and 6 are flow charts illustrating computer executable operations that may be performed in decrypting an IM under an enhanced encryption scheme.
Figure 6:
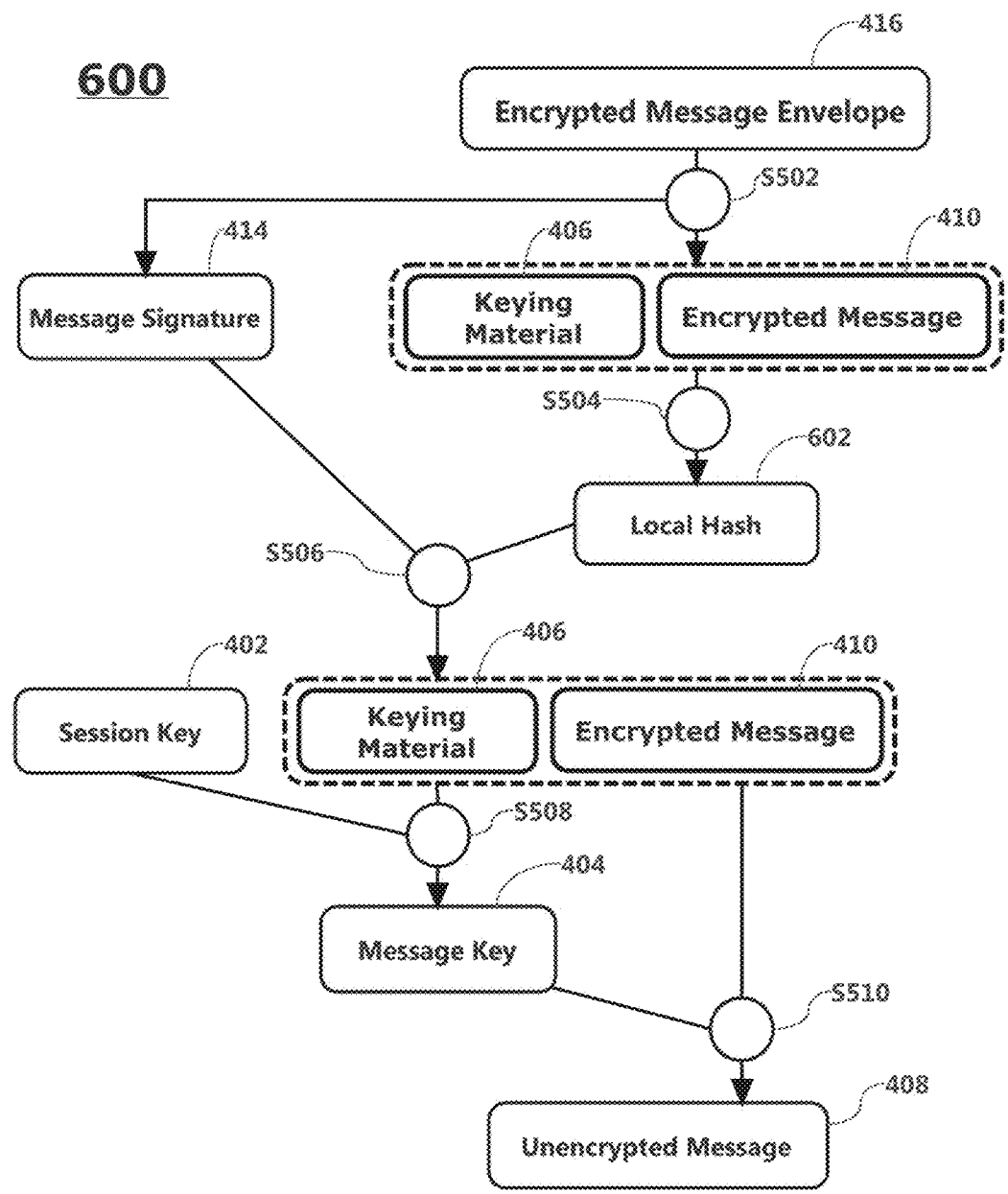

Referring now to FIGS. 5 and 6, a flow chart 500 and state diagram 600 illustrate a process for decrypting an incoming instant message 416 using an enhanced protection scheme. Since the receiving device has the sending device keys, the receiving device parses (at step S502) the incoming encrypted message envelope 416 to obtain the encrypted message 410, the random keying material 406 and the signed digital hash 414. The keying material 406 and the encrypted message 410 are hashed (at step S504) to obtain a local hash 602 using, for example, SHA2-512. The receiving device verifies (at step S506) the message signature by decrypting the signed hash 414 with the sender's public signing key to get the sent hash. If the hashes match then they have verified that the received hash was sent using the sender's private signing key. The receiver uses the random keying material 406 in combination with the sender's public encryption key and the receiver's private encryption key (a.k.a. session key 402) to regenerate (at step S508) the message key 404. The message key 404 is used to decrypt (at step S510) the encrypted message 410. The message 410 may be decrypted using, for example, AES in Counter (CTR), but any decryption protocol will suffice.

FIG. 7 illustrates a chats list user interface (UI) 700 which includes a number of chat list entries 702 each corresponding to an IM conversation with an IM contact. In the example shown in FIG. 7, both protected and default IM conversations are listed together and without distinguishing between the two types of chats. However, it can be appreciated that separate chat lists could also be used, or a distinguishing feature applied to either the default or protected chats (e.g., color, font, badge, etc.). It can be appreciated that other IM UIs can also be modified to include distinguishing features applied to either the default or protected chats, e.g., contact lists (listing contacts), notifications/updates lists, etc. Moreover, the various IM UIs shown and/or discussed herein can be updated to include status information regarding key exchanges, pass phrase exchanges, invitation exchanges, and other processes involving communications between the mobile device 10 and one or more contacts. By selecting the list entry 404 associated with Contact Robbie Ren as shown in FIG. 7, a pending protected IM conversation UI 800 is displayed as shown in FIG. 8, in which a pass phrase entry dialog 802 is provided. The pass phrase entry dialog 802 includes an explanatory message 804 to instruct the user as to the purpose of the pass phrase and procedure for beginning a protected chat. The pass phrase entry dialog 802 also includes a pass phrase entry field 806, for entering a pass phrase 808. The pass phrase 808 can be automatically generated and populated by the IM application, or can be created and/or edited by the user, e.g., by selecting the pass phrase entry field 806 to begin typing as illustrated with the provision of a cursor in FIG. 8. By selecting a cancel button 810 the protected chat initiation (and thus key exchange with Contact Robbie Ren) can be aborted. By selecting a next button 812, the pass phrase is sent to Contact Robbie Ren to initiate the key exchange process.

Figure 10:
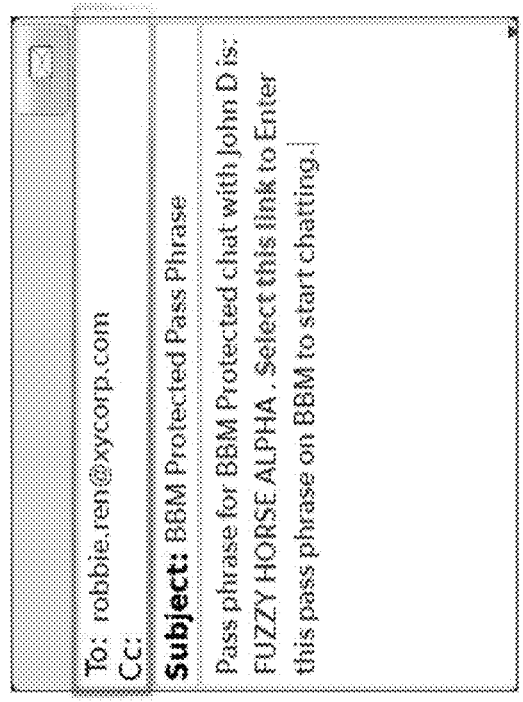
FIG. 10 is a screen shot of an example of a email generated to send a pass phrase for a protected IM conversation.
Figure 9:
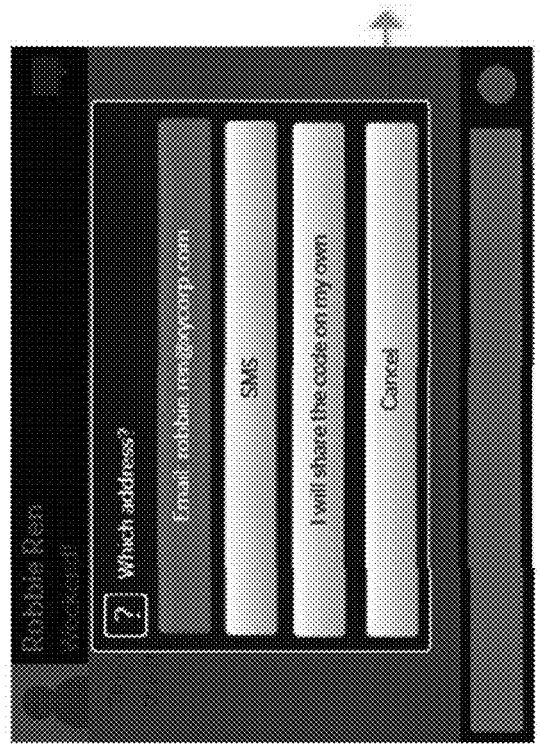
FIG. 9 is a screen shot of an example of a graphical user interface for selecting an out of band channel for sending the pass phrase of FIG. 7.

In some examples the user can be provided with an opportunity to select from a plurality of available out-of-band communication channels, for example, if permitted by the protected policy and if available on the mobile device 102. FIG. 9 illustrates a contact type selection dialog that is displayed after selecting the next button. The contact type selection dialog includes a list of available contact types, which can identify the communication medium and/or an associated address (e.g., phone number, email address, etc.). In this example, an entry for Contact Robbie Ren selected, which includes an email address, namely "robbie.ren@xycorp.com". A cancel button is also provided to enable the send pass phrase process to be aborted. By selecting the entry as shown in FIG. 9, an email message composition UI is displayed as shown in FIG. 10. It can be appreciated that for other contact types, other corresponding message composition UIs would be displayed. It can also be appreciated that a default message may be sent automatically to thereby skip the message composition step.

The email composition UI includes a "To" entry field that is, in this example, pre-populated with the selected email address. The content of the email message is also pre-populated with an invitation message. The invitation message indicates what the pass phrase is, and may optionally include a link to direct the recipient to a pass phrase entry UI.

Figure 11:
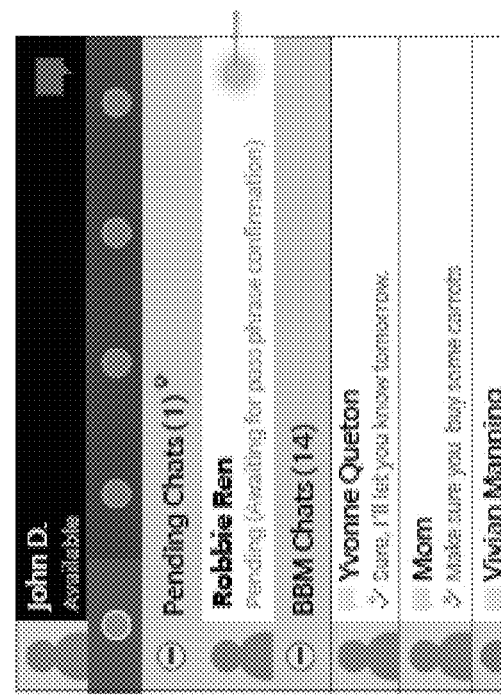
FIG. 11 is a screen shot of an example of a graphical user interface on an inviting device indicating a pending protected IM session.

FIG. 11 illustrates a chats list UI 1100 which includes of chat list entries having been confirmed and pending confirmation. Note that the entry for Contact Robbie Ren includes an indicator stating "Pending (Awaiting for pass phrase confirmation)."

Figure 12:
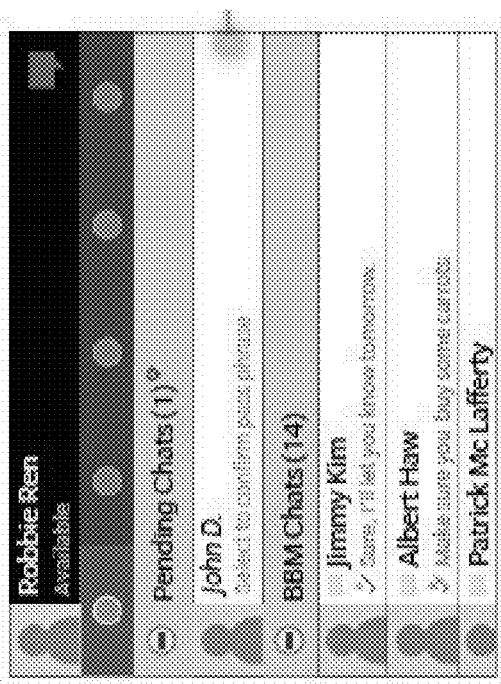
FIG. 12 is a screen shot of an example of a graphical user interface on an invited device indicating a pending protected IM session.
Figure 13:
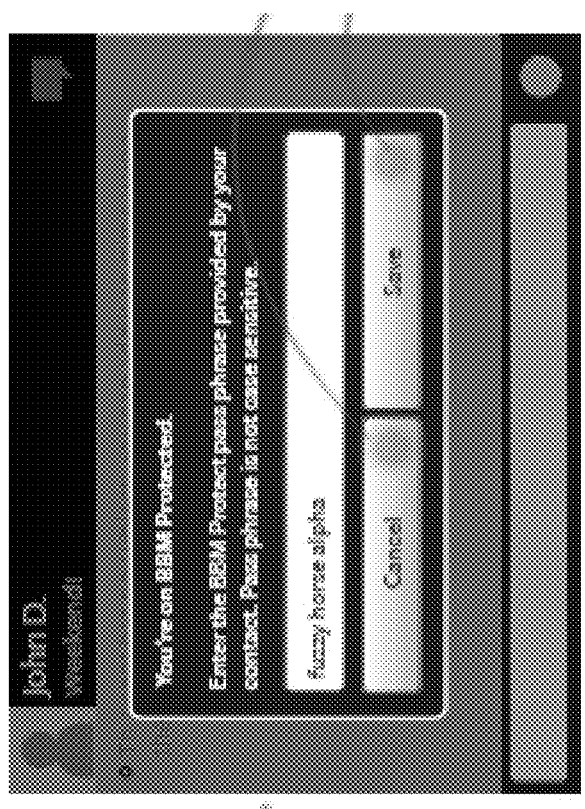
FIG. 13 is a screen shot of an example of a graphical user interface on an invited device requesting input of an out of band pass phrase.

FIG. 12 illustrates a chats list UI 1200 which includes of chat list entries on an invited device. The chat list entries include both pending and confirmed contacts. Note that the entry from sender John D. indicates "Select to confirm pass phrase." By selecting the list entry, a pending protected IM conversation UI 1300 for the recipient is displayed as shown in FIG. 13. An input field is provided to enable the recipient user to enter the pass phrase.

Figure 14:
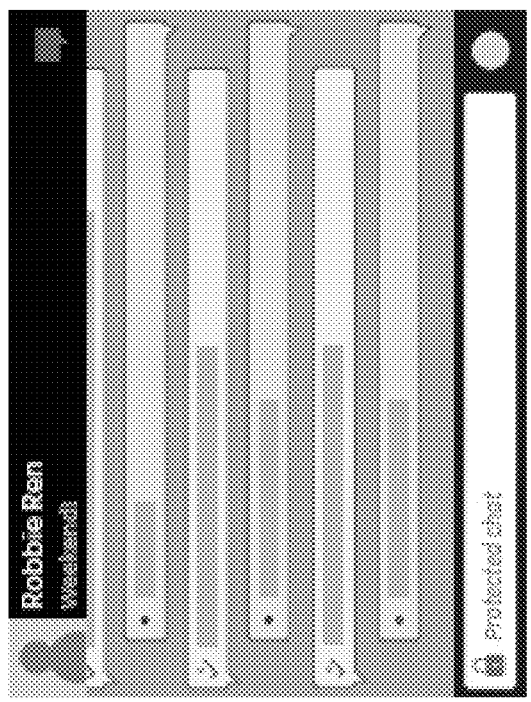
FIG. 14 is a screen shot of an example of a graphical user interface for a protected IM conversation.
Figure 16:
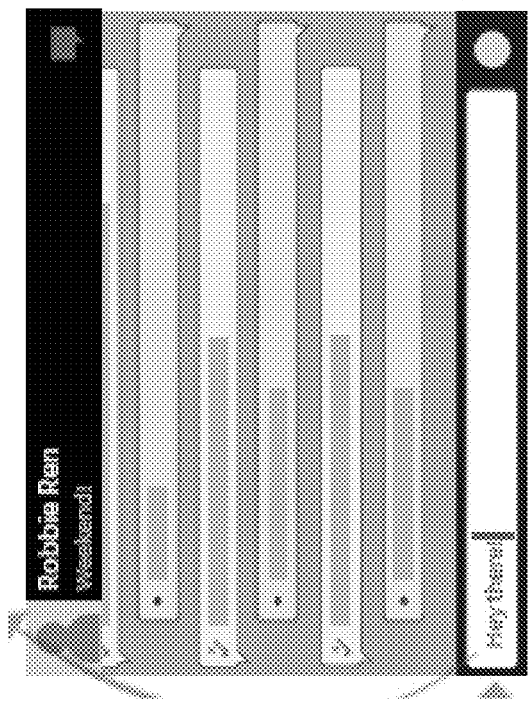
FIG. 16 is a screen shot of an example of a graphical user interface displaying a chat screen for a protected IM conversation.
Figure 15:
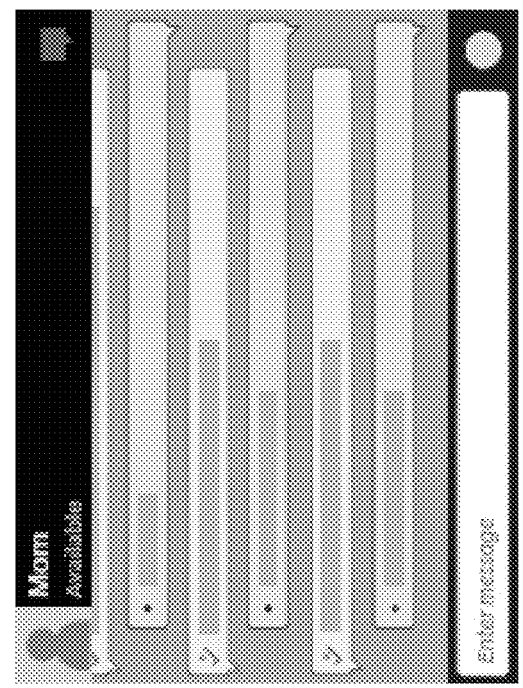
FIG. 15 is a screen shot of an example of a graphical user interface for a default IM conversation.

FIG. 14 illustrates an example of a protected IM conversation user interface 1400. The protected IM conversation UI 1400 includes a badge or icon or other identifying feature in an input field as well as the text "Protected Chat" in order to identify the protected IM conversation UI 1400 as being related to a protected conversation with a contact who is also subjected to a protected policy. It can be appreciated that other visual identifiers can be used such as different text colors, different fonts, border coloring, background coloring, etc. Moreover, the badge could be placed in other locations within the UI 1400, such as in a header portion near the avatar and contact name. FIG. 15 illustrates a default IM conversation UI 1500, which does not include the badge or "Protected chat" text, but instead uses the text "Enter Message" to differentiate between default and protected conversations. The protected IM conversation UI 1400 is used subsequent to performing a key exchange with the corresponding contact. It may be desirable to have the text of the input field in the protected IM conversation UI 1400 be displayed in a different color or font from text entered into the input field of the default IM conversation UI 1500 as shown in FIG. 16.

Figure 17:
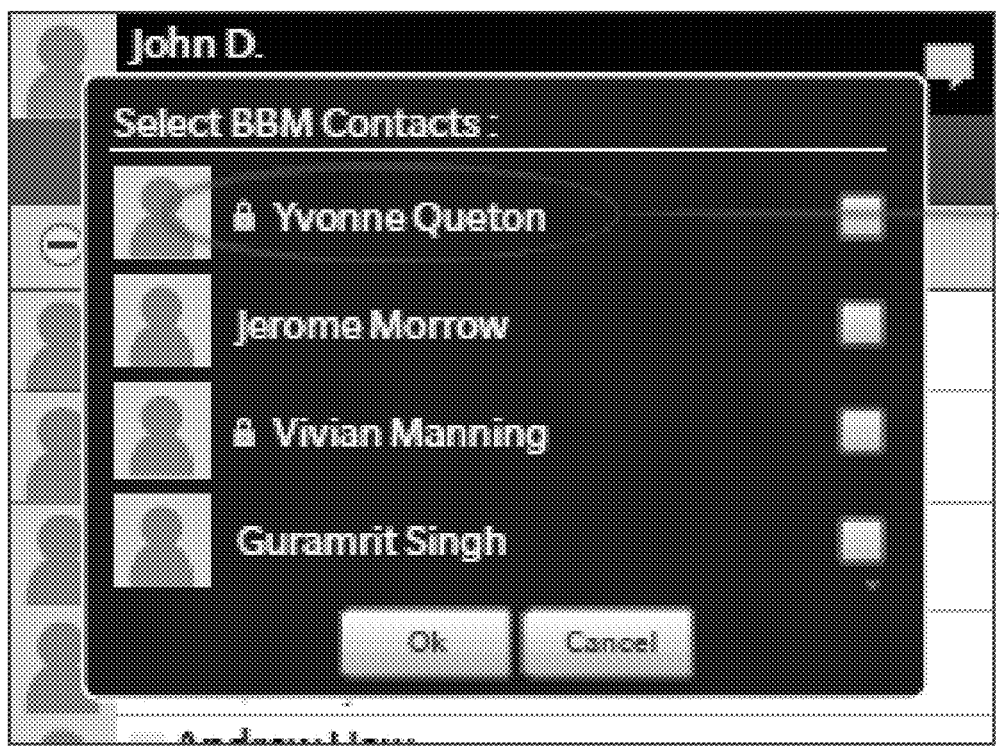
FIG. 17 is a screen shot of an example of a graphical user interface for a inviting contacts to a protected multi-cast conversation.

FIG. 17 illustrates an example screen shot of a user interface for inviting contacts to a multi-cast chat. After indicating that a multi-cast chat is desired, a section box appears displaying a listing of available contacts for selection. A badge or other indicator appears by the name of contacts that may communicate in a protected IM mode using enhanced security. Contacts that do not have this capability are indicated without a badge. In order to have a protected multi-cast IM chat, each participant in the chat must be able to communicate using enhanced encryption protocols. If any selected participant is unable to communicate using enhanced protection, the multi-cast conversation will only be secured via the default encryption method.

Figure 18:
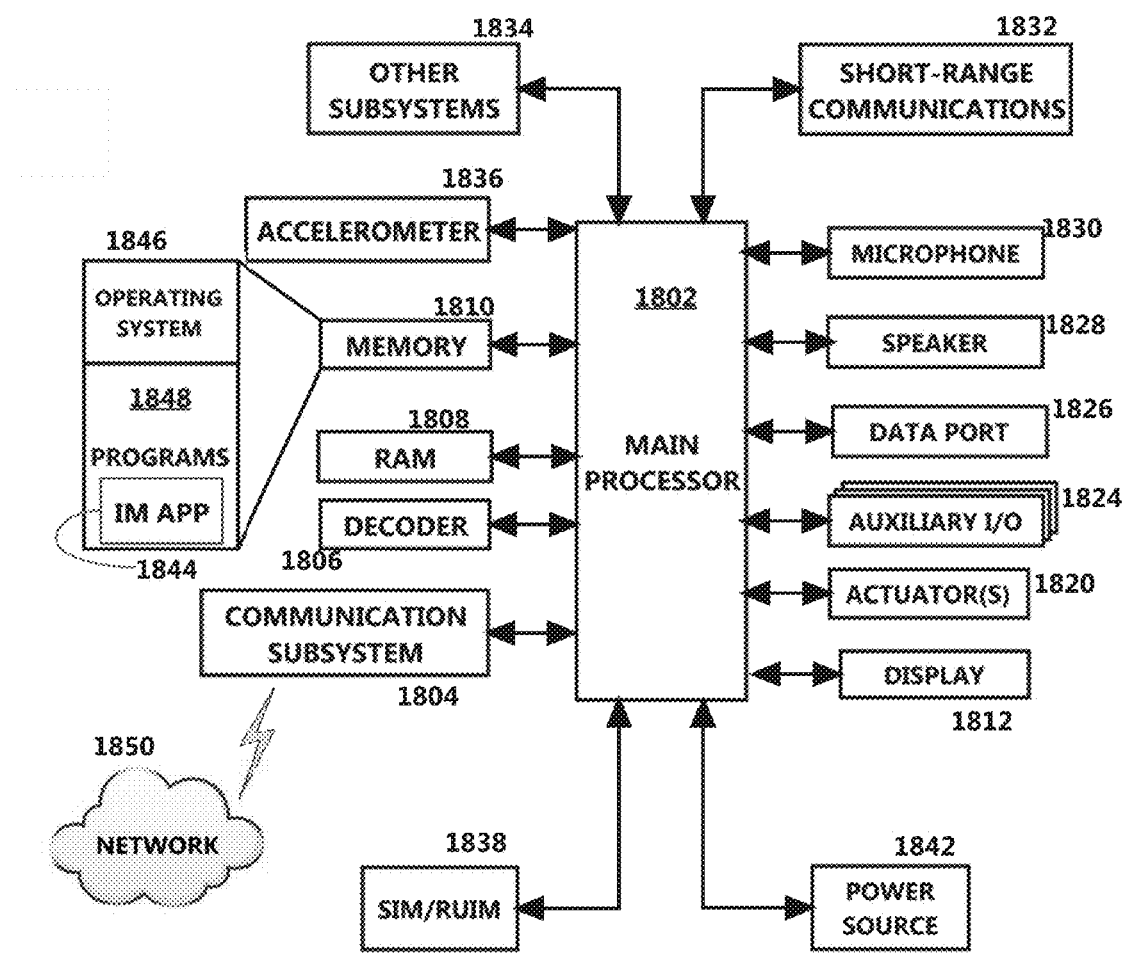
FIG. 18 is a block diagram of an example of a configuration for a mobile electronic communication device.

A block diagram of an example of a wireless communication device 102, 104 is shown in FIG. 18. The wireless communication device 102, 104 includes multiple components, such as a processor 1802 that controls the overall operation of the wireless communication device. Communication functions, including data and voice communications, are performed through a communication subsystem 1804. Data received by the wireless communication device is decompressed and decrypted by a decoder 1806. The communication subsystem 1804 receives messages from and sends messages to a wireless network 1850. The wireless network 1850 may be any type of wireless network, including, but not limited to, data wireless networks, voice wireless networks, and networks that support both voice and data communications. A power source 1842, such as one or more rechargeable batteries or a port to an external power supply, powers the wireless communication device.

The processor 1802 interacts with other components, such as Random Access Memory (RAM) 1808, memory 1810, a display 1812 (which may be a touch-sensitive display), one or more actuators 1820, an auxiliary input/output (I/O) subsystem 1824, a data port 1826, a speaker 1828, a microphone 1830, short-range communications 1832, and other device subsystems 1834. User-interaction with a graphical user interface is performed through the touch-sensitive display 1812. Information, such as text, characters, symbols, images, icons, and other items that may be displayed or rendered on a portable electronic device, is displayed on the touch-sensitive display 1812 via the processor 1802. The processor 1802 may interact with an accelerometer 1836 that may be utilized to detect direction of gravitational forces or gravity-induced reaction forces.

To identify a subscriber for network access, the wireless communication device 102, 104 uses a Subscriber Identity Module or a Removable User Identity Module (SIM/RUIM) card 1838 for communication with a network, such as the wireless network 1850. Alternatively, user identification information may be programmed into memory 1810.

The wireless communication device 102, 104 includes an operating system 1846 and software programs or components 148, such as an instant messaging application 1844 that are executed by the processor 1802 and are typically stored in a persistent, updatable store such as the memory 1810. Additional applications or programs may be loaded onto the wireless communication device 102, 104 through the wireless network 1850, the auxiliary I/O subsystem 1824, the data port 1826, the short-range communications subsystem 1832, or any other suitable subsystem 1834.

A received signal such as a text message, an e-mail message, instant message or web page download is processed by the communication subsystem 1804 and input to the processor 1802. The processor 1802 processes the received signal for output to the display 1812 and/or to the auxiliary I/O subsystem 1824. A subscriber may generate data items, for example e-mail messages, which may be transmitted over the wireless network 1850 through the communication subsystem 1804. For voice communications, the overall operation of wireless communication device 102, 104 is similar. The speaker 1828 outputs audible information converted from electrical signals, and the microphone 1830 converts audible information into electrical signals for processing.

The touch-sensitive display 1812 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay. The overlay may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 1812. The processor 1802 may determine attributes of the touch, including a location of a touch. Touch location data may include an area of contact or a single point of contact, such as a point at or near a center of the area of contact. A signal is provided to a display controller (not shown) in response to detection of a touch. A touch may be detected from any suitable contact member, such as a finger, thumb, appendage, or other objects, for example, a stylus, pen, or other pointer, depending on the nature of the touch-sensitive display 1812. Multiple simultaneous touches may be detected.

One or more actuators 1820 may be depressed or activated by applying sufficient force to the actuators 1820 to overcome the actuation force of the actuator. The actuator(s) 1820 may provide input to the processor 1802 when actuated. Actuation of the actuator(s) 1820 may result in provision of tactile feedback.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of establishing secure communications between a first wireless communication device and a second wireless communication device for an instant messaging application, the method comprising:

receiving, at the first wireless communication device, contact information representing a contact associated with the second wireless communication device, the contact information including capability information;

determining from the capability information whether the second wireless communication device is capable of communicating using an enhanced encryption scheme; and responsive to determining that the second wireless communication device is capable of communicating using an enhanced encryption scheme, establishing a protected communication session by:

sending a pass phrase to the second wireless communication device via an out of band channel;

receiving the pass phrase back from the second wireless communication device via the instant messaging application; and communicating with the second wireless communication device using an enhanced encryption scheme.

2. The method of claim 1, further comprising responsive to determining that the second wireless communication device is incapable of communicating using an enhanced encryption scheme, communicating with the second wireless communication device using a default encryption scheme.

3. The method of claim 2, wherein the default encryption scheme is at least one of transport layer security, exchange of private personal identification numbers and unsecured.

4. The method of claim 1 wherein the first wireless communication device has a first associated encryption key pair and a first associated signing key pair and the second wireless communication device has a second associated encryption key pair and a second associated signing key pair.

5. The method of claim 4, wherein each key pair includes a public key and a private key.

6. The method of claim 5, wherein communicating with the second wireless communication device using an enhanced encryption scheme comprises:

transmitting the first encryption key pair and the first signing key pair to the second wireless communication device;
receiving the second encryption key pair and the second signing key pair from the second wireless communication device;
encrypting an outgoing message using the first encryption key pair, the first signing key pair, the second encryption key pair and the second signing key pair; and
decrypting an incoming message the first encryption key pair, the first signing key pair, the second encryption key pair and the second signing key pair.

7. The method of claim 6, wherein encrypting an outgoing message comprises:
establishing a session key from the second public encryption key and the first private encryption key;
establishing a message key using the session key and random keying material;
encrypting the message using the message key to create an encrypted message portion;
hashing the encrypted message portion with the random keying material to create a hash portion;
signing the hash portion with the first private signing key to create a signed hash portion;
wrapping the signed hash portion, the random keying material and the encrypted message portion in a message envelope to create the outgoing message; and
transmitting the outgoing message for delivery to the second wireless communication device.

8. The method of claim 6, wherein decrypting an incoming message comprises:
receiving the incoming message;
parsing the incoming message to obtain a signed hash portion, random keying material and an encrypted message portion;
hashing the random keying material and the encrypted message portion to create a local hash;
decrypting the signed hash portion with the first public signing key to obtain a sent hash;
comparing the sent hash with the local hash;
responsive to determining that the sent hash and the local hash match, deriving a message key from the first public encryption key, the second private encryption key and the random keying material; and
decrypting the incoming message using the message key.

9. The method of claim 1, wherein the out of band channel is one of email, short message service (SMS), a phone call, a barcode reader, a near field communication (NFC) and an in-person exchange.

10. The method of claim 1, further comprising, responsive to receiving the pass phrase from the second wireless communication device via the instant messaging application, displaying via the instant messaging application, an indication that the first wireless communication device communicates with the second communication device using the enhanced encryption scheme.

11. The method of claim 10, wherein the indicator is at least one of an icon, a badge, a textual indicator, and a format change for of an existing text field.

12. The method of claim 11, wherein the format change is at least one of a color change, a font change, a size change and a style change.

13. The method of claim 1, wherein the contact information includes capability information set by an enterprise server according to an information technology policy.

14. The method of claim 1, wherein:
the messaging application includes a multiplicity of contacts, each contact associated with a corresponding wireless communication device and having contact information including capability information; and
wherein some contacts have capability information indicating that the corresponding wireless communication device is capable of communicating using an enhanced encryption scheme and other contacts have capability information indicating that the corresponding wireless communication device is incapable of communicating using an enhanced encryption scheme.

15. The method of claim 14, further comprising establishing a protected multi-cast chat session when all participants of a multi-cast chat are capable of communicating using an enhanced encryption scheme.

16. The method of claim 15, wherein the multiplicity of contacts communicate using a multiplicity of enhanced encryption schemes.

17. A wireless communication device comprising:
a transceiver configured to receive contact information representing a contact associated with a second wireless communication device, the contact information including capability information;
a memory storing an instant messaging application;
a display displaying a graphical user interface of the instant messaging application; and
a processor coupled to the transceiver, the memory and the display, the processor configured to:
determine from the capability information whether the second wireless communication device is capable of communicating using an enhanced encryption scheme;
responsive to determining that the second wireless communication device is capable of communicating use an enhanced encryption scheme, establishing a protected communication session by causing the transceiver to:
send a pass phrase to the second wireless communication device via an out of band channel;
receive the pass phrase back from the second wireless communication device via the instant messaging application; and
communicate with the second wireless communication device using an enhanced encryption scheme.

18. The wireless communication device of claim 17, wherein the processor is further configured to, responsive to determining that the second wireless communication device is incapable of communicating using an enhanced encryption scheme, cause the transceiver to communicate with the second wireless communication device using a default encryption scheme.

19. A computer program product for establishing secure communications between a first wireless communication device and a second wireless communication device for an instant messaging application, the computer program product comprising a non-transitory computer readable storage medium having program instructions embodied therewith, the program instructions executable by a device to cause the device to perform a method comprising:
receiving, at the first wireless communication device, contact information representing a contact associated with the second wireless communication device, the contact information including capability information;

determining from the capability information whether the second wireless communication device is capable of communicating using an enhanced encryption scheme; and responsive to determining that the second wireless communication device is capable of communicating using an enhanced encryption scheme, establishing a protected communication session by:

sending a pass phrase to the second wireless communication device via an out of band channel;

receiving the pass phrase back from the second wireless communication device via the instant messaging application; and communicating with the second wireless communication device using an enhanced encryption scheme.

20. The computer program product of claim 19, further comprising computer instructions for:

responsive to determining that the second wireless communication device is incapable of communicating using an enhanced encryption scheme, communicating with the second wireless communication device using a default encryption scheme.

\* \* \* \* \*